Patented June 3, 1941

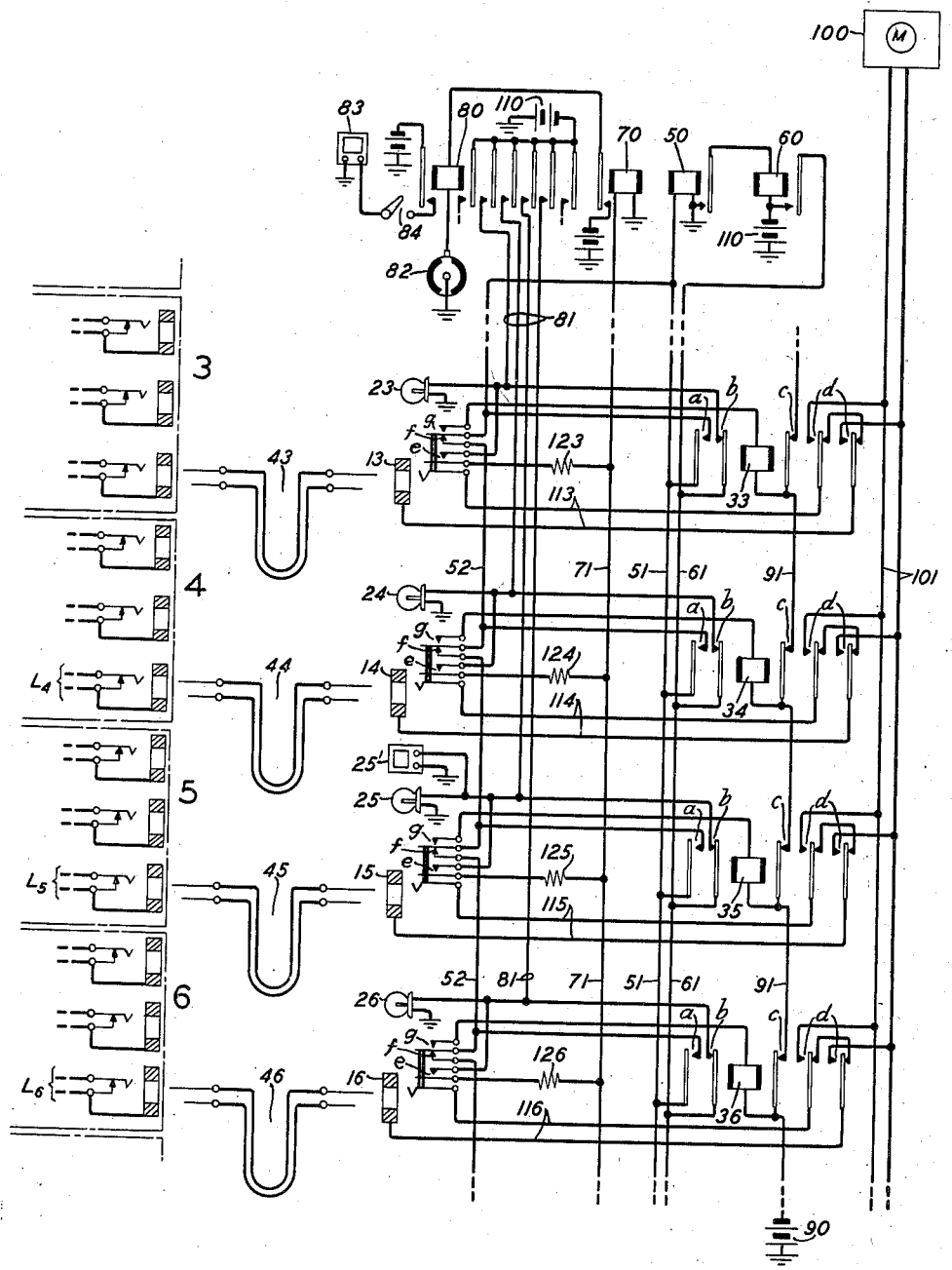

2,244,566

UNITED STATES PATENT OFFICE 2,244,566

TELEGRAPH TEST BOARD

James Trapp Neiswinter, Cleveland, Ohio, assignor to American Telephone and Telegraph Company, a corporation of New York Application January 27, 1940, Serial No. 316,006

16 Claims. (Cl. 178—69)

This invention relates to improvements in telegraph test boards and, more particularly, in the equipment at such boards for testing subscribers' lines individually by means of a common special test set.

Telegraph test boards are usually arranged with line jacks for interconnecting line circuits with each other, the jacks and lines being divided into groups and each group being arranged in an operator's position.

A section of the board in each position is usually arranged for special tests of the lines to determine the characteristics of the line as to bias and other causes of distortion affecting the signals. For this purpose a special test set is provided common to all the positions and made accessible at each position through the special test sections or test set appearances referred to. The appearance includes a jack by means of which the test set can be connected through a patching cord to any of the line jacks in the position; a busy lamp is included in the test set appearance to indicate when the test set is busy at another appearance on the test board.

The test set proper may be more or less complex and thus may be arranged to perform a comparatively large number of different tests on any particular line circuit. Thus, the set may be used for a comparatively long time for testing any one line circuit. It also occurs under service conditions that the operator at one position may occupy a set in routine tests of all the lines in the position. The test set, therefore, may be kept busy for an extended time at any one position and it frequently occurs that during such test period by one position the test set may be desired for tests at another position and, in fact, may be strongly needed in case of an emergency at such other position.

It is, therefore, an object of the invention to arrange the special testing equipment at a telegraph test board in such a way that an operator wanting the test set may give an indication to the operator using the test set as by giving a special signal through the instrumentalities of the testing system.

It is a specific object of the invention to arrange the busy indicating means to also indicate, by a signal characteristically different from the busy signal, that the test set is wanted at another position.

In accordance with the arrangement of the invention, the jacks in the test set appearance have auxiliary contacts which are operated, when the plug of the patching cord is inserted, to extend the circuit by means of which the busy signal is energized during the use of the test set at another position to a special signaling equipment, thereby operating this special signal or alarm equipment to send special signals to the signaling means at the various positions.

In accordance with a specific arrangement, the special or alarm signal is applied to the same signaling means as already are giving a busy indication when the alarm signal is applied.

In accordance with another specific arrangement, the signal indicator at the position using the test set is disconnected from the source of busy signal so that the busy condition is indicated only at all the other positions and so that when the special alarm signal is applied to all the signal indicators, only the indicator at the position using the test set will give the special alarm indication.

In accordance with still another specific arrangement, the source of busy signal applies a steady busy potential to the busy indicator and the source of alarm signal applies the same potential intermittently to the busy indicator so that all indicators receiving the steady busy signal will give a steady indication independently of the application of the intermittently applied potential, whereas the indicator at the busy position, being disconnected from the steady busy potential, will give an intermittent signal when the intermittent alarm potential is applied to all indicators.

Other more specific features of the invention will appear from the following description of a specific embodiment of the invention, such as is illustrated in the accompanying drawing.

The drawing shows a circuit diagram of a characteristic portion of the equipment of a test board to such an extent only as will be necessary for an understanding of the invention.

Referring now to the drawing, a plurality of operators' positions are schematically indicated as each comprising a field of line jacks, such as the groups 3, 4, 5 and 6. Each jack comprises the usual tip and ring connected to the two line conductors, such as L4, L5 and L6.

Each position comprises the test set appearance including a test set jack, such as 13, 14, 15 and 16, and busy indicator means, such as the switchboard lamps 23, 24, 25 and 26.

Each position also includes a patching cord, such as 43, 44, 45 and 46, for connecting the test set jack with any one of the line jacks in the position.

Associated with each test set jack there is a relay, such as 33, 34, 35 and 36, connected into a chain circuit passing through all the appearances for preventing the operation at any one time of more than one of these relays, thereby preventing the test set from being used at more than one position at a time. These relays are connected to respond to the insertion of a plug into the associated jack and have contacts for connecting the common test set to the jack. Each jack has the usual tip and ring connected through the contacts of the associated relay to the common circuit leading to the test set; the jack also has a plurality of auxiliary contacts which are operated by the insertion of a plug to control the relay and signal circuits, as will be described hereinafter.

Common to all the appearances there is a busy relay 50 and a relay 60 for applying a steady busy potential to the busy lamps at all the appearances in response to the operation of any one of the test set jacks. Also common to the appearances there is an alarm relay 70 and a pulsing relay 80 for intermittently applying the busy potential to the busy lamps at all appearances under control of a second operated test set jack.

The operation of the system will now be described for a particular set of conditions.

It will first be assumed that the circuit is in rest or normal condition, as shown in the drawing. It will next be assumed that it is desirable to use the test set 100 for testing of the line circuit L5 at position 5.

The operator inserts the plugs of patching cord 45 into the test set jack 15.

The insertion of the plug into jack 15 operates the auxiliary contacts on the jack, thereby opening the auxiliary chain contacts $f$ and closing the busy contacts $g$. A circuit for the operation of individual relay 35 and common busy relay 50 may now be traced from battery 90 in the lower right-hand corner of the drawing, over the chain circuit 91, through the winding of relay 35, over contacts $g$ of jack 15, over the chain circuit 52 extending over chain contacts $f$ of jacks 14 and 13 and any other succeeding jacks of other appearances through the winding of busy relay 50 to ground. Relay 35, in operating, opens at its chain contacts $c$, the chain circuit 91 extending to succeeding relays 34, 33, etc., thereby preventing those relays from operating; relay 35 closes its locking contacts $a$, thereby providing a locking circuit for relays 35 and 50 extending from the previously traced chain circuit 52 over the contacts $a$ and conductor 51 directly to the winding of relay 50, which locking circuit thus is independent of the operation of any other test set jack. The operation of jack 15, in opening the chain contacts $f$, opened the chain circuit 52 through the preceding jacks 16, etc., thereby preventing the operation of the preceding relays 36, etc., in response to operation of their associated jacks.

Relay 35, in operating, closed its make contacts $d$, thereby extending the test jack circuit 115 to the common circuit 101 leading to the test set 100. When at any time thereafter the patching cord 45 is inserted in the line jack for line L5, the line circuit will be opened at the normal contact in the jack and connected over the established circuit to the test set 100 and the testing of the line circuit L5 may immediately proceed.

Relay 50, in operating, causes relay 60 to operate and to apply the source of busy potential 110, which may be the usual central office battery, over the common conductor 61, contacts $b$ of relay 33 to the busy lamp 23, which thus is lighted. Similar circuits to busy lamps 24 and 26, etc., may be traced over the $b$ contacts of their associated relays. The lamp 25 is, however, not lighted by the busy potential since the $b$ contact of relay 35 is open. In this manner all the idle appearances are notified by the steady lighting of their lamps that the test set is busy at another appearance.

This condition will prevail until the cord 45 is withdrawn upon the completion of the tests, in which case the relays 35, 50 and 60 are restored to normal and the busy indication discontinued, or else until the test set is desired at another position, say position 4.

In this case the operator at position 4 inserts the plug of cord 44 into jack 14, thereby operating the auxiliary contacts of the jack; as already explained, the relay 34 can not operate under this condition. The closing of alarm contacts $e$ on jack 14 now completes a circuit from the busy potential 110 over the contact of relay 60, conductor 61, $b$ contacts of relay 34, alarm contacts $e$ of jack 14, resistance 124, over the common conductor 71 and through the winding of alarm relay 70 to ground. Relay 70 operates and, in turn, completes the circuit from battery over its make contact through relay 80 and circuit interrupter 82. Thus, relay 80 will operate intermittently and the interrupter 82 may be arranged to close the circuit about once every second. Each time relay 80 operates it applies the source 110, which preferably is the same as the source of busy potential 110 applied by relay 60 to conductor 61, to a plurality of individual conductors 81 and thus to the particular conductor 81 connected to the lamp 25, which until now has been extinguished. The resistance 124 and other corresponding resistances 123, 125, 126, etc., being serially included in the circuit for relay 70, the common conductor 71 will be at comparatively low intermediate potential after jack 14 is operated, so that lamp 25 will now alternately receive the low intermediate potential from conductor 71 and full potential from the contacts of relay 80 and thus will intermittently light to indicate to the operator at position 5 that the test set is desired at another appearance. The intermittent potential from source 110 is also applied to the particular conductors 81 leading to lamps 23 and 26, etc., which already are steadily lighted from the potential 110 at the relay 60; these lamps, therefore, are not affected by the application of the intermittent alarm potential.

After a predetermined time the operator at position 4 removes the plug from jack 14, thereby restoring to normal the alarm circuit, including relays 70 and 80, and discontinuing the flashing signal by lamp 25. The operator at position 5 at a convenient time disconnects the test set from the appearance, thereby removing the busy condition applied by the busy circuit, including relays 50 and 60, and extinguishing all lamps. The test set may now be used by the operator at position 4 or at any other position.

The signaling equipment may, of course, be modified in different ways from that described above to meet special requirements and some of these modifications have been illustrated as examples in the drawing.

Thus at position 5 the visual signal 25 is supplemented by an audible signal 25′ shown connected in multiple to the lamp 25; the audible signal may be a sounder mounted under the usual shelf of the position or it may be any other convenient electromagnetic device suitable for the purpose. Assuming device 25' to be a sounder, the steady busy potential applied by relay 60, when another appearance makes the set busy, may produce a single click at the time relay 60 is operated, but the sounder will otherwise remain silent while the lamp 25 shows busy. However, when appearance 15 is busy, there will be no indication by lamp 25 and sounder 25' until the intermittent alarm potential from source 110 is applied in response to the operation of a second test set jack. In this case, the lamp will flash and the sounder will click twice every second.

If it is desired for the case of an emergency to give a general audible alarm when the test set is desired at an idle appearance, the relay 30, in operating, may apply the busy potential intermittently over a switch 84 in closed position to an audible signal 83 which may be a gong; the gong 83 thus may be arranged to strike once every second.

What is claimed is:

1. A telegraph test board comprising a plurality of operators' positions and a common test circuit, each of said positions including contact means for, in operated condition, connecting the position to said test circuit, common relay means connected to respond to cooperation of said contact means at any two of said positions for establishing an alarm condition at one of said two positions.

2. A telegraph test board comprising a plurality of operators' positions and a common test circuit, each of said positions including contact means for, in operated condition, connecting the position to said test circuit, common relay means connected to respond to said contact means in simultaneously operated condition at a first operated and a second operated position for establishing an alarm condition at the first operated position.

3. A telegraph test board comprising a plurality of operators' positions and a common test circuit, each of said positions including contact means for, in operated condition, connecting the position to said test circuit, busy relay means connected to respond to operation of any one of said contact means to establish a busy condition at the others of said contact means, and alarm relay means connected to respond to subsequent operation of any of the others of said contact means during said busy condition to establish a different alarm condition at the first operated contact means.

4. A telegraph test board comprising a plurality of operators' positions and a common test circuit, each of said positions including contact means for, in operated condition, connecting the position to said test circuit, common busy relay means connected to be operated by any one of said contact means in operated condition to establish a busy condition at all of said positions, individual relay means at each of said positions connected to be operated by said contact means in operated condition at the same position for preventing said busy condition from being established at the same position, and common alarm relay means connected to be operated by any other subsequently operated contact means to establish a different alarm condition at said same position.

5. A telegraph test board comprising a plurality of operators' positions and a common test circuit, each of said positions including contact means for, in operated condition, connecting the position to said test circuit, common busy relay means connected to respond to operation of any one of said contact means to establish a busy condition at all of said positions, individual relay means at each of said positions connected to respond to operation of said contact means at the same position for preventing said busy condition being established at the same position, and common alarm relay means connected upon response of said individual relay means to respond to subsequent operation of any other of said contact means to establish a different alarm condition at said same position.

6. A telegraph test board comprising a plurality of operators' positions and a common test circuit, each of said positions including contact means for, in operated condition, connecting the position to said test circuit, signal indicating means connected to respond to operation of said contact means at one of said positions to give a busy indication and at two positions simultaneously to give a different alarm indication.

7. A telegraph test board comprising a plurality of operators' positions and a common test circuit, each of said positions including contact means for, in operated condition, connecting the position to said test circuit, signal indicating means connected to respond to operation of said contact means at any other position to give a busy indication and connected in the operated condition of said contact means of the same position to respond to the subsequent operation of said contact means at another position to give a different alarm indication.

8. A telegraph test board comprising a plurality of operators' positions and a common test circuit, each of said positions including contact means for, in operated condition, connecting the position to said test circuit, signal indicating means connected to respond to operation of said contact means at any one position to give a busy indication at all other positions and connected to respond to the simultaneous operation of said contact means at said one position and at any other position to give a different alarm indication at said one position.

9. A telegraph test board comprising a plurality of operators' positions and a common test circuit, each of said positions including contact means for, in operated condition, connecting the position to said test circuit, signal indicating means connected to be operated by said contact means in operated condition at any other of said positions for giving a busy indication and individual relay means connected to respond to operation of said contact means at the same position for preventing the operation of said signal indicating means; and common alarm relay means connected upon response of said individual relay means to be operated in response to subsequently operated contact means at any other position for operating said signal indicating means to give a different alarm indication at said same position.

10. A telegraph test board comprising a plurality of line circuits to be tested, a test set and a plurality of test set appearances; each of said appearances including contact means for connecting said test set to said line circuits one at a time, individual relay means having idle and operated conditions, and busy signal means; said test board further comprising common busy relay means having idle and operated conditions, and common alarm relay means, said busy relay means being responsive to connection through said contact means at any one of said appearances to energize steadily said signal means at all of said appearances, said individual relay means being responsive to connection through the associated contact means for, in operated condition, disconnecting the associated signal means from energization by said busy relay means, and said alarm relay means being connected by said busy relay means in operated condition and by said individual relay means in idle condition at any of said appearances to respond to operation of the associated contact means for energizing intermittently the disconnected signal means at any other position.

11. A telegraph test board comprising a plurality of line circuits to be tested, a test set and a plurality of test set appearances; each of said appearances including contact means for connecting said test set to said line circuits one at a time, individual relay means having idle and operated conditions, and busy signal means; said test board further comprising common busy relay means having idle and operated conditions, and common alarm relay means, said common busy relay means being responsive to connection through said contact means at any appearance for, in operated condition, steadily energizing said signal means at all appearances, said common alarm relay means being responsive to operation of said contact means at any appearance for, in operated condition, intermittently energizing said signal means at all appearances, said individual relay means at any of said appearances being connected to respond to connection through the associated contact means for, in operated condition, locking said busy relay means in operated condition and disconnecting said busy relay means from the associated signal means, and said alarm relay means being connected by one of said contact means in operated condition and by one of said individual relay means in idle condition to respond to operation of said contact means associated with said idle individual relay means to intermittently energize said disconnected signal means.

12. A telegraph test board comprising a plurality of line circuits to be individually tested, a common test set, a plurality of test set appearances for connecting said test set to any one of said line circuits, a common source of busy potential, a common source of alarm potential, common busy relay means for, in operated condition, applying said busy potential to all idle appearances, common alarm relay means for, in operated condition, applying said alarm potential to any busy appearance; each of said test set appearances comprising contact means and individual relay means both for, in simultaneous operated condition, extending the connection from said test set to a line circuit, and signal indicating means connected to receive said busy potential to indicate that the test set is busy and to receive said alarm potential to indicate that the busy test set is wanted; said contact means having busy contacts connected for, in operated condition, operating said individual relay means and said common busy relay means, said contact means and the associated individual relay means of each appearance having contacts interconnected for, in simultaneous operated condition, preventing the operation of any other of said individual relay means, said busy relay means having contacts connected for, in operated condition, applying said busy potential to all of said signal indicating means, alarm contacts on said contact means and said individual relay means interconnected for, in operated and unoperated condition, respectively, operating said common alarm relay means, said alarm relay means having contacts connected for, in operated condition, applying said alarm potential to all of said signal indicating means and said alarm contacts on said individual relay means being connected to, in operated condtion, disconnect said busy potential from said signal indicating means.

13. A telegraph test board comprising a plurality of line circuits to be individually tested, a common test set, a plurality of test set appearances for connecting said test set to any one of said line circuits, a common busy signal circuit, common busy relay means connected to, in operated condition, apply a busy potential to said busy signal circuit, common alarm relay means, a common operating chain circuit; each of said test set appearances comprising contact means for, in operated condition, extending the connection from said test set to a line circuit, individual relay means connected in said operating chain circuit for, in operated condition, completing said connection from the test set to a line circuit, and signal indicating means normally connected to said busy signal circuit; said contact means having auxiliary busy contacts connected for, in operated condition, operating said individual relay means and said busy relay means, said individual relay means having auxiliary disconnect contacts for, in operated condition, disconnecting said signal indicating means from said busy signal circuit, said contact means and said individual relay means having other contacts connected in said operating chain circuit for, in operated condition, preventing operation of said individual relay means in any other appearance, said contact means having auxiliary alarm contacts for, in operated condition, connecting said alarm relay means to said busy signal circuit over said disconnect contact for operation by said busy potential, and said alarm relay means having contacts, for, in operated condition, applying a source of alarm potential to said signal indicating means.

14. A telegraph test board comprising a plurality of groups of line circuits to be tested, a common test set, a test set appearance for each of said groups of lines for connecting said test set to said line circuits one at a time, a source of steady busy potential, circuit interrupting means, common busy relay means connected for, in operated condition, extending said busy potential to all of said appearances, common alarm relay means connected for, in operated condition, extending said busy potential through said circuit interrupting means intermittently to all of said appearances, each of said test set appearances comprising contact means and individual relay means both having contacts interconnected for, in operated condition, extending the connection from said test set to a line circuit, and signal indicating means connected to receive steady busy potential for indicating by a steady signal that the test set is busy at another appearance and to receive said intermittent busy potential for indicating by an intermittent signal that the test set is wanted at another appearance; said contact means having busy contacts connected for, in operated condition, operating said individual relay means and said common busy relay means, said contact means and the associated individual relay means of each appearance having contacts interconnected for, in operated condition, opening the operating circuits for all other individual relay means, said busy relay means having contacts connected for, in operating condition, connecting said steady busy potential to said signal indicating means at all appearances for giving said steady signal, said contact means having alarm contacts connected for, in operated condition, extending said connected steady busy potential at the associated signal indicating means to said alarm relay means for operation thereof, said alarm relay means having contacts connected for, in operated condition, extending said busy potential through said interrupting means directly to said signal indicating means to all appearances, and said individual relay means having contacts for self-locking and having other contacts connected for, in operated condition, opening the connection to the associated signal indicating means from said busy relay means contacts to condition said associated signal indicating means for response to said interrupted busy potential to give said intermittent signal.

15. A telegraph test board comprising a plurality of operators' positions and a common circuit for operative association with said positions one at a time, each of said positions including contact means for in operated position associating the operator's position with said common circuit, and signal indicating means connected by said contact means in non-operated position for giving a busy indication in response to operation of said contact means at any other one of said operators' positions and connected by said contact means in operated position for giving a distinct alarm indication in response to operation of said contact means at any other one of said operators' positions.

16. A telegraph test board comprising a plurality of common circuit appearances and a common circuit for operative association with said appearances one at a time, each of said appearances including contact means having idle and busy positions for in the operated busy position associating the appearance with said common circuit, and signal indicating means; circuit means between said appearances connected for operating said signal indicating means in response to operation of said contact means at a busy appearance to indicate a busy condition at all other idle appearances, and connected for operating said signal indicating means in response to operation of said contact means in any one of said other idle appearances to indicate a distinct alarm condition at said busy appearance.

JAMES T. NEISWINTER.